(12) United States Patent
Lior et al.

(10) Patent No.: US 12,743,385 B2
(45) Date of Patent: Sep. 22, 2026

(54) SYMMETRICAL CONTROL OF HARDWARE PERIPHERALS

(71) Applicant: Mellanox Technologies, Ltd., Yokneam (IL)

(72) Inventors: Ayal Josef Lior, Kiryat Ono (IL); Ortal Bashan, Tel Aviv (IL)

(73) Assignee: Mellanox Technologies, Ltd, Yokneam (IL)

( * ) Notice: Subject to any disclaimer, the term of this patent is extended or adjusted under 35 U.S.C. 154(b) by 247 days.

(21) Appl. No.: 18/636,351

(22) Filed: Apr. 16, 2024

(65) Prior Publication Data

US 2025/0321902 A1 Oct. 16, 2025

(51) Int. Cl.
*G06F 13/10* (2006.01)

(52) U.S. Cl.
CPC .......... *G06F 13/10* (2013.01); *G06F 2213/40* (2013.01)

(58) Field of Classification Search
CPC ............................ G06F 13/10; G06F 2213/40
See application file for complete search history.

(56) References Cited

U.S. PATENT DOCUMENTS

2018/0314318 A1* 11/2018 Remis ........................ G06F 1/26
2025/0117205 A1* 4/2025 Minnich ................... G06F 8/63
2025/0173158 A1* 5/2025 Liu ....................... G06F 9/4411
2025/0286833 A1* 9/2025 Markow ................ H04L 49/30

OTHER PUBLICATIONS

NVIDIA, "Networking Switches—NVIDIA CS8500 800 Port HDR Switch System User Manual," NVIDIA Docs HuB, pp. 1-3, last updated May 22, 2023, as downloaded from https://docs.nvidia.com/networking/display/cs8500sysum/switch+management+tools#src-25141338_SwitchManagementTools-AccessingtheCPUviatheEthernetConnector.

* cited by examiner

*Primary Examiner* — Zachary K Huson
(74) *Attorney, Agent, or Firm* — Meitar Patents LTD.; Daniel Kligler

(57) ABSTRACT

A network device includes packet processing circuitry, one or more hardware peripherals, a Baseboard Management Controller (BMC) and a Central Processing Unit (CPU). The packet processing circuitry is to communicate packets over a network. The BMC is to control the hardware peripherals. The CPU is to perform control-plane operations for communicating the packets by the packet processing circuitry. Each of the CPU and the BMC is to modify states of the hardware peripherals, and to synchronize the other of the BMC and the CPU with the modified state of the hardware peripherals.

20 Claims, 1 Drawing Sheet

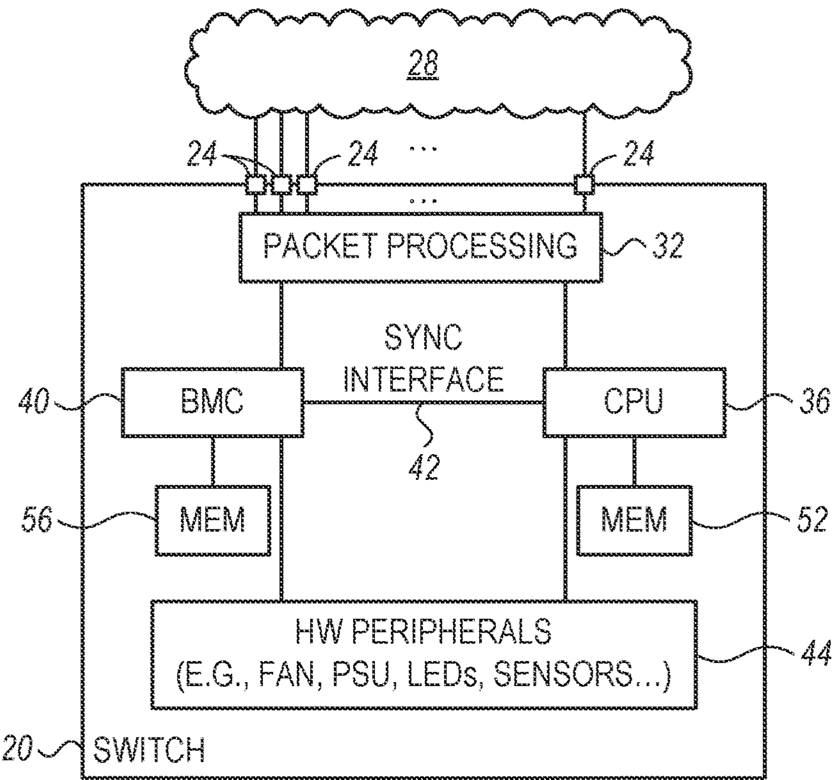
FIG. 1
FIG. 2
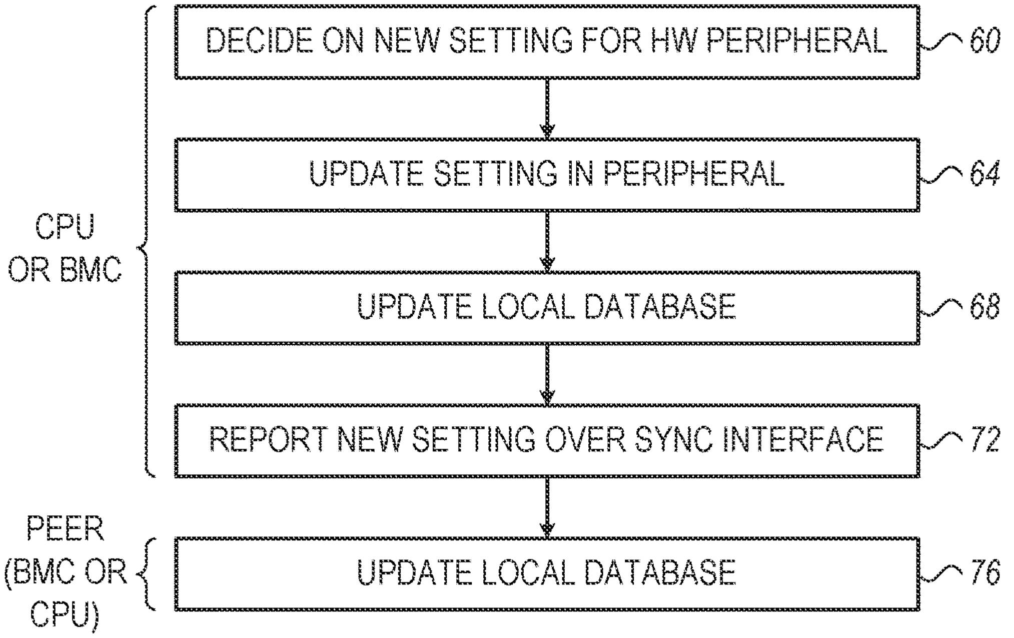

SYMMETRICAL CONTROL OF HARDWARE PERIPHERALS

TECHNICAL FIELD

The present description relates generally to network devices, and particularly to methods and systems for control of hardware peripherals in a network device.

BACKGROUND

Network switches and other network devices often comprise various hardware peripherals, such as fans, power supplies and regulators, Light Emitting Diode (LED) indicators, and possibly one or more sensors. Some peripherals have variable settings that can be adapted. Some peripherals provide status information that can be read.

SUMMARY

An embodiment that is described herein provides a network device including packet processing circuitry, one or more hardware peripherals, a Baseboard Management Controller (BMC) and a Central Processing Unit (CPU). The packet processing circuitry is to communicate packets over a network. The BMC is to control the hardware peripherals. The CPU is to perform control-plane operations for communicating the packets by the packet processing circuitry. Each of the CPU and the BMC is to modify states of the hardware peripherals, and to synchronize the other of the BMC and the CPU with the modified state of the hardware peripherals.

In some embodiments, the network device further includes an interface to communicate between the CPU and the BMC, and the CPU and the BMC are to synchronize one another with the modified states of the hardware peripherals by communicating over the interface. In a disclosed embodiment, the CPU is to communicate with a first management system, and the BMC is to communicate with a second management system, different from the first management system. In an embodiment, the CPU is to record the modified states of the hardware peripherals in a first data structure, and the BMC is to record the modified states of the hardware peripherals in a second data structure, separate from the first data structure.

In some embodiments, each of the CPU and the BMC is to read a status of the hardware peripherals, and to synchronize the other of the BMC and the CPU with the read status. In an embodiment, a given hardware peripheral is to send a status indication to both the CPU and the BMC. In another embodiment, a given hardware peripheral is to send a status indication to the CPU, and the CPU is to relay the status indication to the BMC.

In a disclosed embodiment, the CPU is to modify a state of a hardware peripheral by communicating with the hardware peripheral directly, not via the BMC. In an example embodiment, the BMC is to modify a state of a hardware peripheral indirectly, by instructing the CPU to modify the state.

In disclosed embodiments, the hardware peripherals include at least one peripheral type selected from (i) a cooling device, (ii) an optical indicator, (iii) a power supply, (iv) a voltage regulator, (v) a cooling-liquid leakage sensor and (vi) a security device.

There is additionally provided, in accordance with an embodiment that is described herein, a method including communicating packets over a network by a network device that includes a Baseboard Management Controller (BMC), a Central Processing Unit (CPU), and one or more hardware peripherals. Control-plane operations for communicating the packets are performed using the CPU. Using each of the CPU and the BMC, states of the hardware peripherals are modified, and the other of the BMC and the CPU is synchronized with the modified state of the hardware peripherals.

The present description will be more fully understood from the following detailed description of the embodiments thereof, taken together with the drawings in which:

BRIEF DESCRIPTION OF THE DRAWINGS

FIG. 1 is a block diagram that schematically illustrates a network device, in accordance with an embodiment that is described herein; and FIG. 2 is a flow chart that schematically illustrates a method for controlling hardware peripherals in a network device, in accordance with an embodiment that is described herein.

DETAILED DESCRIPTION OF EMBODIMENTS

Overview

Embodiments that are described herein provide improved methods and apparatus for controlling hardware peripherals in network switches and other network devices. In some disclosed embodiments, a network device comprises multiple ports, packet processing circuitry, a Central Processing Unit (CPU) and a Baseboard Management Controller (BMC). The network device further comprises one or more hardware peripherals, such as fans or other cooling devices, LEDs or other optical indicators, Trusted Platform Modules (TPMs) or other security devices, power supplies and/or failure sensors.

In some embodiments, the packet processing circuitry of the network device sends and receives packets over a network via the ports. The CPU is responsible, among other tasks, to handle control-plane operations for the packet communication of the network device. Unlike conventional network-device configurations, however, in the disclosed network devices both the CPU and the BMC are capable of managing the hardware peripherals.

In the present context, the term "managing a hardware peripheral" refers to performing various operations including, for example, modifying a state of a peripheral and/or reading a status of a peripheral. The term "modifying a state of a peripheral" refers to operations including, for example, modifying a setting of a peripheral (e.g., the speed of a fan or the voltage of a power supply), resetting a peripheral, updating software or firmware in a peripheral, and/or any other suitable operation.

Typically, the CPU and the BMC each hold a separate data structure (also referred to as "local database") that records the states and/or status of the various peripherals. When the CPU or the BMC modifies the state of a peripheral or reads the status of a peripheral, the CPU or BMC updates its local database and also notifies its peer (the BMC or CPU) of the updated information. The peer (BMC or CPU) updates its local database, as well, to reflect the modified state or status of the peripheral. In this manner, each of the CPU and the BMC has a complete, up-to-date picture of the states and status of the hardware peripherals.

In some embodiments, the network device comprises a fast, symmetric interface connecting between the CPU and the BMC. This interface is referred to herein as a “synchronization interface”. The synchronization interface may comprise, for example, a Peripheral Component Interface express (PCIe) link, an Ethernet over Universal Serial Bus (USB) link, or any other suitable interface. The CPU and the BMC use this interface for synchronizing each other with updates to states and/or status of hardware peripherals.

Although the scheme described above appears symmetrical, it is not mandatory that each of the CPU and BMC has a direct physical connection to each of the hardware peripherals. For example, the BMC may manage a certain peripheral indirectly, by requesting the CPU to perform the desired operation and report. The CPU and BMC may use the synchronization interface between them for this purpose.

The disclosed technique is advantageous for various reasons. For example, different networks have different requirements as to how to manage the hardware peripherals of their network devices. In some networks the CPUs of the various network devices communicate with one management system, and the BMCs of the network devices communicate with a different management system. The responsibilities of the two management systems may vary from one network to another. Still other networks may use only a single management system, and/or may not assume the existence of a BMC. For example, some networks perform all management operations via a Network Operating System (NOS) running on the CPU. The disclosed techniques provide complete flexibility in configuring a network device to match the management requirements of the network.

The disclosed techniques also provide a high degree of resilience and redundancy. For example, the disclosed network devices can continue to manage their hardware peripherals seamlessly, even when a CPU or BMC is out of service, e.g., due to failure, rebooting or software update.

System Description

FIG. 1 is a block diagram that schematically illustrates a network device, in the present example a network switch 20, in accordance with an embodiment that is described herein. The description that follows refers mainly to a network switch, by way of example, but the disclosed techniques are applicable to any other suitable type of network device.

In the embodiment of FIG. 1, switch 20 comprises multiple ports 24 for sending and receiving packets to and from a network 28. Switch 20 further comprises packet processing circuitry 32 (sometimes referred to as a packet processor) that receives packets from network 28 via ports 24, processes the received packets, and forwards the packets back to the network via the ports. Switch 20 and network 28 may communicate packets in accordance with any suitable protocol, e.g., Ethernet or InfiniBand™.

Switch 20 further comprises a Central Processing Unit (CPU) 36 and a Baseboard Management Controller (BMC) 40. A synchronization interface 42 connects between CPU 36 and BMC 40. Synchronization interface 42 may comprise, for example, a PCIe link, an Ethernet-over-USB link, or any other suitable interface.

Switch 20 additionally comprises one or more hardware peripherals 44. Peripherals 44 may comprise, for example, one or more cooling devices (e.g., fans or liquid-cooling devices), one or more LEDs or other optical indicators, one or more TPMs or other security devices, one or more power supplies or regulators, one or more sensors (e.g., a sensor for detecting leakage of a cooling liquid from a liquid-cooling device), and/or any other suitable type of hardware peripheral.

CPU 36 and BMC 40 manage hardware peripherals 44 using methods that are described below. For this purpose, CPU 36 is coupled with a memory 52 for storing a local database of peripheral states and status, and BMC 40 is coupled with a memory 56 for storing a similar local database.

The configuration of switch 20, as shown in FIG. 1, is an example configuration that is chosen purely for the sake of conceptual clarity. In alternative embodiments, any other suitable switch configuration can be used. Elements that are not necessary for understanding the principles of the present solution have been omitted from the figures for clarity.

The various elements of switch 20 may be implemented in hardware, e.g., in one or more Application-Specific Integrated Circuits (ASICs) or FPGAs, in software, or using a combination of hardware and software elements. In some embodiments, CPU 36 and/or BMC 40 may comprise a programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Symmetrical Control of Hardware Peripherals by CPU and BMC

In some embodiments, CPU 36 and BMC 40 each have the capability to manage hardware peripherals 44. Consider, for example, a fan having an adjustable speed. In some embodiments, each of CPU 36 and BMC 40 is configured to adjust the fan speed. If CPU 36 sets the fan speed, CPU 36 (i) records the new fan speed in the local database in memory 52, and (ii) reports the new fan speed to BMC 40 over synchronization interface 42. BMC 40 then records the new fan speed in the local database in memory 56. If BMC 40 sets the fan speed, BMC 40 (i) records the new fan speed in the local database in memory 56, and (ii) reports the new fan speed to CPU 36 over synchronization interface 42. CPU 36 then records the new fan speed in the local database in memory 52.

In some embodiments, both CPU 36 and BMC 40 have a direct connection to the fan in order to set the fan speed. In other embodiments, only CPU 36 has a direct connection with the fan, and, for BMC 40 to set the fan speed, BMC 40 instructs CPU 36 to set the fan speed via the direct connection. In yet other embodiments, only BMC 40 has a direct connection with the fan, and, for CPU 36 to set the fan speed, CPU 36 instructs BMC 40 to set the fan speed via the direct connection.

The scenario above relates to a change in settings of a hardware peripheral 44, by way of example. The disclosed features (e.g., synchronizing the local databases of the CPU and the BMC, the use of direct and/or indirect connections) applies to any other form of managing a hardware peripheral, e.g., reading the status of a peripheral, resetting a peripheral, or updating software or firmware of a peripheral. Updating of software or firmware may be performed, for example, in a power supply or a TPM. In some embodiments, the CPU or BMC may have a direct connection to one or more of peripherals 44, and apply indirect control to one or more other peripherals 44.

In some embodiments, CPU 36 communicates (via ports 24, over network 28) with a certain management system, possibly along with CPUs of other network devices. BMC 40 communicates (also via ports 24, over network 28) with a different management system, possibly along with BMCs of other network devices. Each of CPU 36 and BMC 40 may report the states and/or status of any of hardware peripherals 44 to its respective management system. In other embodiments, only CPU 36, or only BMC 40, reports the states and/or status of hardware peripherals 44 to a management system.

FIG. 2 is a flow chart that schematically illustrates a method for controlling hardware peripherals 44 in switch 20, in accordance with an embodiment that is described herein. The method begins with CPU 36 or BMC 40 deciding on a new setting for a certain peripheral 44, at an update decision stage 60.

At a setting updating stage 64, CPU 36 or BMC 40 sets the new setting in the relevant peripheral 44.

At a database updating stage 68, CPU 36 or BMC 40 updates its local database (in memory 52 if the update was initiated by CPU 36, and in memory 56 if the update was initiated by BMC 40) with the new setting.

At a synchronization stage 72, CPU 36 or BMC 40 reports the new setting to its peer over interface 42. (The peer BMC 40 if the update was initiated by CPU 36, and CPU 36 if the update was initiated by BMC 40.)

At a database updating stage 76, the peer (BMC 40 or CPU 36) updates its local database with the new setting as reported over interface 42.

The method flow of FIG. 2 is an example flow that is chosen purely for the sake of conceptual clarity. In alternative embodiments, any other suitable flow can be used.

For example, FIG. 2 refers to updating the setting of a peripheral. A similar process can be used to carry out any other suitable form of controlling a peripheral. For example, to read the status of a certain hardware peripheral 44, the peripheral may send its status only to CPU 36, in which case CPU 36 reports the status to BMC 40 over interface 42. As another example, a peripheral may send its status only to BMC 40, in which case BMC 40 reports the status to CPU 36 over interface 42. In yet another example, a peripheral may send its status to both CPU 36 and BMC 40. In either case, both CPU 36 and BMC 40 update their local respective databases with the new status.

It will be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network device, comprising:

packet processing circuitry, to communicate packets over a network;

one or more hardware peripherals;

a Baseboard Management Controller (BMC), to control the hardware peripherals; and a Central Processing Unit (CPU), to perform control-plane operations for communicating the packets by the packet processing circuitry, wherein, for a given state modification operation to be performed in a hardware peripheral among the hardware peripherals, each of the CPU and the BMC is to perform the given state modification operation in the hardware peripheral, and to synchronize the other of the BMC and the CPU with a modified state of the hardware peripheral.

2. The network device according to claim 1, further comprising an interface to communicate between the CPU and the BMC, wherein the CPU and the BMC are to synchronize one another with the modified state of the hardware peripheral by communicating over the interface.

3. The network device according to claim 1, wherein the CPU is to communicate with a first management system, and wherein the BMC is to communicate with a second management system, different from the first management system.

4. The network device according to claim 1, wherein the CPU is to record the modified state of the hardware peripheral in a first data structure, and wherein the BMC is to record the modified state of the hardware peripheral in a second data structure, separate from the first data structure.

5. The network device according to claim 1, wherein each of the CPU and the BMC is to read a status of the hardware peripheral, and to synchronize the other of the BMC and the CPU with the read status.

6. The network device according to claim 1, wherein the hardware peripheral is to send a status indication to both the CPU and the BMC.

7. The network device according to claim 1, wherein the hardware peripheral is to send a status indication to the CPU, and wherein the CPU is to relay the status indication to the BMC.

8. The network device according to claim 1, wherein the CPU is to modify the state of the hardware peripheral by communicating with the hardware peripheral directly, not via the BMC.

9. The network device according to claim 1, wherein the BMC is to modify the state of the hardware peripheral indirectly, by instructing the CPU to modify the state.

10. The network device according to claim 1, wherein the hardware peripheral is of at least one peripheral type selected from (i) a cooling device, (ii) an optical indicator, (iii) a power supply, (iv) a voltage regulator, (v) a cooling-liquid leakage sensor and (vi) a security device.

11. A method, comprising:

communicating packets over a network by a network device that includes a Baseboard Management Controller (BMC), a Central Processing Unit (CPU), and one or more hardware peripherals;

using the CPU, performing control-plane operations for communicating the packets; and for a given state modification operation to be performed in a hardware peripheral among the hardware peripherals, using any of the CPU and the BMC, performing the given state modification operation in the hardware peripheral, and synchronizing the other of the BMC and the CPU with the modified state of the hardware peripheral.

12. The method according to claim 11, wherein synchronizing the other of the BMC and the CPU comprises communicating over an interface set between the CPU and the BMC.

13. The method according to claim 11, further comprising communicating between the CPU and a first management system, and communicating between the BMC and a second management system, different from the first management system.

14. The method according to claim 11, further comprising recording the modified state of the hardware peripheral by the CPU in a first data structure, and recording the modified state of the hardware peripheral by the BMC in a second data structure, separate from the first data structure.

15. The method according to claim 11, further comprising, by each of the CPU and the BMC, reading a status of the hardware peripheral and synchronizing the other of the BMC and the CPU with the read status.

16. The method according to claim 11, further comprising sending a status indication from the hardware peripheral to both the CPU and the BMC.

17. The method according to claim 11, further comprising sending a status indication from the hardware peripheral to the CPU, and relaying the status indication from the CPU to the BMC.

18. The method according to claim 11, wherein modifying the state of the hardware peripheral by the CPU comprises communicating with the hardware peripheral directly, not via the BMC.

19. The method according to claim 11, wherein modifying the state of the hardware peripheral by the BMC is performed indirectly, by instructing the CPU to modify the state.

20. The method according to claim 11, wherein the hardware peripheral is of at least one peripheral type selected from (i) a cooling device, (ii) an optical indicator, (iii) a power supply, (iv) a voltage regulator, (v) a cooling-liquid leakage sensor and (vi) a security device.

* * * * *